United States Defensive Publication [19] (H) [11] T102,004

Doane et al. [43] Jul. 6, 1982

[54] ELECTROSTATOGRAPHIC CARRIER BEADS AND METHOD OF MAKING

[76] Inventors: Donald L. Doane, 836 Wilfred Rd., Berthoud, Colo. 80513; Vincent W. Ting, 7900 Grasmere Dr., Boulder, Colo. 80301

[21] Appl. No.: 319,814

[22] Filed: Nov. 9, 1981

[51] Int. Cl.[3] ..... G03G 9/10

[52] U.S. Cl. ..... 430/108; 428/407; 430/137

[57] ABSTRACT

Electrophotographic carrier beads, comprising steel shot as a core material, are coated and then cured by a single-pass manufacturing process, using a coating liquid consisting of a water-based modified epoxy whose three-dimensional, highly cross-linked cellular structure, is packed with a fluoropolymer. This water-based carrier coating makes use of the water-based modified epoxy described in U.S. Pat. No. 4,212,781.

For a first example, this epoxy material is converted to an aqueous dispersion by mixing with deionized water, an aminoplast cross-linking resin (hexamethoxymethylmelamine), fluorinated ethylene-propylene, and chromium oxide.

This aqueous dispersion is coated onto steel shot by a single-pass fluidized bed manufacturing process.

For a second example, this epoxy material is converted to an aqueous dispersion by mixing with deionized water, said aminoplast cross-linking agent, said fluorinated ethylene-propylene and a second fluoropolymer, polytetrafluoroethylene.

This aqueous dispersion is coated onto steel shot in the same manner.

9 Claims, No Sheets Drawing,

14 Pages Specification

The file of this unexamined application may be inspected and copies thereof may be purchased (849 O.G. 1221, Apr. 9, 1968).